Dec. 10, 1940.  E. LIPSON  2,224,635
ALTERNATING CURRENT METHOD AND APPARATUS FOR LOGGING WELLS
Filed Nov. 28, 1939

EDWARD LIPSON
INVENTOR.
BY Jesse R. Stone
Lester B. Clark
ATTORNEYS.

Patented Dec. 10, 1940

2,224,635

UNITED STATES PATENT OFFICE 2,224,635

ALTERNATING CURRENT METHOD AND APPARATUS FOR LOGGING WELLS

Edward Lipson, Houston, Tex., assignor to Casolog Inc., a corporation of Texas

Application November 28, 1939, Serial No. 306,472

7 Claims. (Cl. 175—182)

This invention relates to improvements in electrical well logging and more particularly to means and method for logging cased bore holes by the utilization of an alternating electric current.

The invention is based upon the discovery that the casing in a well bore possesses a rectifying characteristic and that the amplitude of the rectified component of current from various levels within the casing to a point exteriorly thereof is indicative of the nature of earth structures penetrated by the bore hole. It is therefore a primary object of the invention to provide method and apparatus for determining the nature of the geological formations penetrated by a cased bore hole by introducing an alternating potential between various points within the casing and a point in the earth exteriorly of the casing.

It is also an object of the invention to determine the nature of penetrated subsurface formations in a cased bore hole by traversing the interior of the casing with an electrode, an alternating electrical potential being continuously applied thru the casing and the surrounding earth formations between such electrode and a ground electrode in spaced relation with the well bore, observations being made of variations in the rectified current flowing in the earth between the casing and the ground electrode.

A further object is to apply an alternating electrical potential between points in a cased well bore and a ground electrode and observing the fluctuations in the unidirectional potential between spaced points in the area of current flow as the level of the point of application of potential within the well bore is changed.

Another object is to log a cased bore hole by observing the fluctuations in a unidirectional component of current rectified by the casing and caused to flow through the surrounding formations.

Other objects together with the foregoing will be apparent from the following description taken in connection with the drawing in which.

Figure 1:
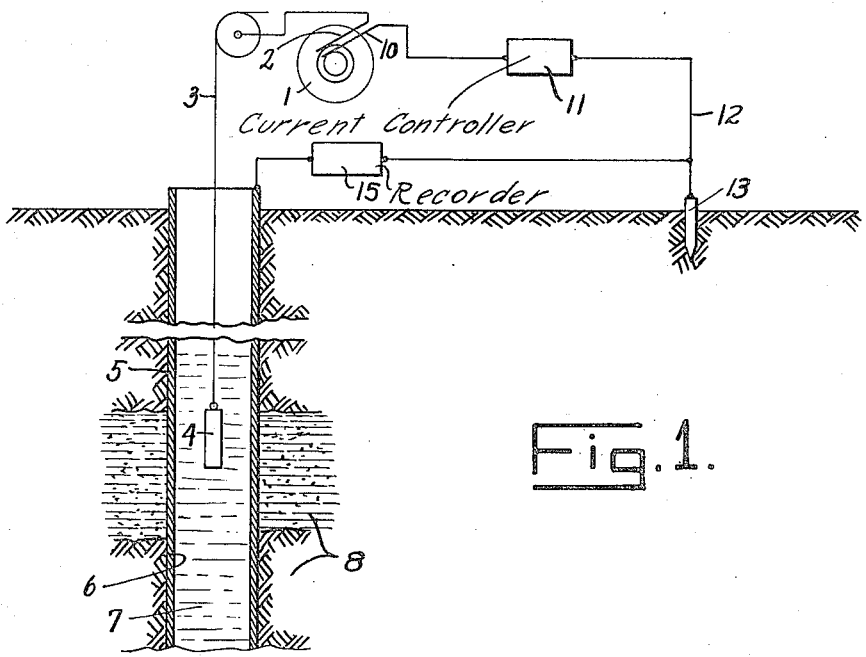
Fig. 1 is a diagrammatic illustration of an embodiment of an invention wherein a single pair of electrodes is used, one of such electrodes being grounded and the other being movable within the casing in the bore hole.

In the drawing the numeral 1 refers to an alternating current generator which may be of any suitable type and which is capable of producing an alternating potential wave which may be either sinusoidal or non-sinusoidal in form. The terminal 2 of the generator is connected by means of an insulated conductor 3 to an electrode 4 immersed in the liquid 7 within the casing 5 which is set in the well bore 6 penetrating the subsurface strata generally indicated as 8.

It is to be understood that, as is well known in the art, the electrode 4 may be made to traverse the casing 5 while in contact with the well liquid 7 which serves as a conducting medium whereby electric current may flow from the electrode 4 to the casing 5 and thence to the surrounding formation 8.

The other terminal 10 of the generator 1 is connected to a control means generally indicated as 11. The terminal is thence connected thru conductor 12 to ground electrode 13 which is embedded in the earth in spaced relation with the bore hole 6. It is apparent that by means of the electric circuit as just described, current may be made to flow from the generator 1 to the electrode 4 and thence thru the casing 5 and the formations 8 to the ground electrode 13 and to the other terminal 10 of the generator 1. The control means 11, of any suitable type, enables the maintenance of a constant current thru this circuit.

When an alternating potential is applied between the electrodes 4 and 13, an alternating current tends to flow thru the casing 5 and the formations 8 to the electrode 13. It has been found, however, that this portion of the electric circuit has unidirectional characteristics and that there is therefore a pronounced unidirectional component in the resulting current. It has been found also that this component varies as the electrode 4 is made to traverse the casing 5 and that the variations in the unidirectional component of current are correlatable with the formations 8 penetrated by the bore hole 6.

In order to determine the variations in the rectified or unidirectional component of current flowing in the earth when an alternating potential is applied between the electrodes 4 and 13, a circuit may be established thru an indicating or recording instrument 15 from the casing 5 to the electrode 13 as indicated in Fig. 1. The instrument 15 is of any suitable construction to provide suitable indications or record so that the variations in the unidirectional current may be observed. For example an indicating or recording potentiometer may be used or alternately a suitable amplifier and indicating or recording means may be utilized.

Figure 2:
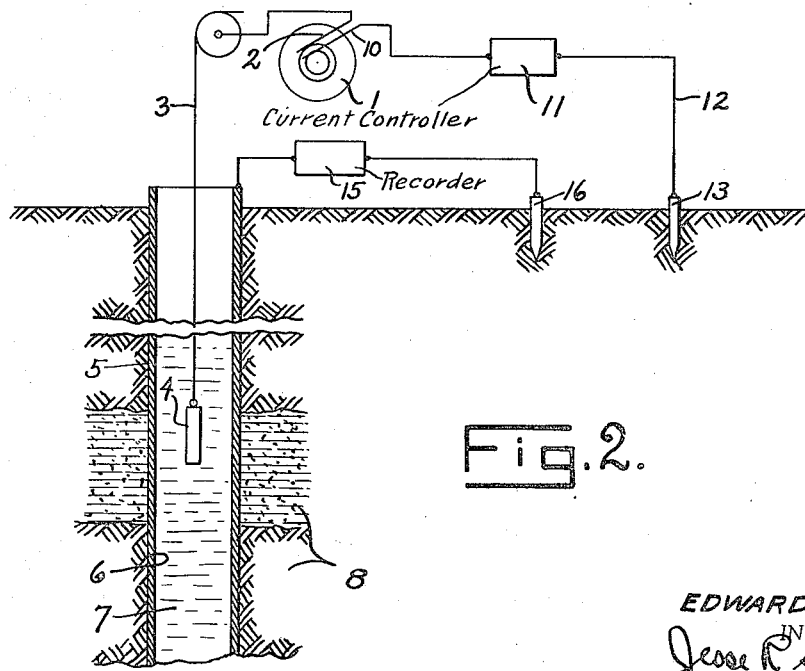
Fig. 2 is a diagrammatic illustration showing a manner of practicing the invention by the measurement of the unidirectional potential at spaced points in the area of current conduction.

An essential feature of the invention is the observation of the variations in the rectified or unidirectional current flowing in the earth, one manner of making such observations being shown in Fig. 1. Since, however, variations may be observed by an indicator or recorder actuated by the unidirectional potential produced between spaced points in the current conducting area, it is obvious that the invention may assume different forms from that shown in Fig. 1. For example the instrument 15 may be connected to a separate electrode 16 (Fig. 2) placed at any desired point that there will be a difference in the unidirectional potential between the terminals of the potential circuit. It seems apparent that this detecting or potential circuit may be energized from electrodes placed at any spaced points within the area of current conduction, the position of the spaced points being so arranged that sufficient energy may be available to provide usable indications or record of the fluctuations in the unidirectional current as the movable electrode 4 is made to traverse the casing 5.

The exact nature of conditions which give rise to rectification of the current is unknown. It is believed, however, that the casing 5 has an oxide coating which is formed either before or after the casing is set in the bore hole 6 and that such oxide causes the casing to act as a rectifier of the current that would otherwise flow as an alternating current thru the earth between the electrodes 4 and 13. This is offered as a possible explanation of the phenomenon appearing in the practice of the invention but it is to be understood that this is offered as a possible explanation and it is intended that the invention shall not be limited thereby.

The attempted explanation is believed plausible however in view of the fact that desired results are not obtainable if the applied voltage exceeds a limit beyond which the rectifying characteristic ceases to exist. It would appear that the use of an excess voltage breaks down the oxide and gives rise to this condition. If such condition does occur operations may be continued by lowering the voltage whereupon it appears that subsequent formation of an oxide permits continued logging operations to be carried out.

Attention is also directed to the fact that, while not essential to the successful practice of the invention, the electrodes 13 and 16 or other electrodes used in the practice of the invention should be of the non-polarizing type. The use of this type of electrodes prevents undesirable modifications of the records obtained because of the polarizing effect that is produced by currents entering or leaving the electrodes.

Reference is now made to the operation of the apparatus above described to clarify the technique constituting an important phase of the invention. The electrode 13 is first embedded in the ground at a distance from the mouth of the bore hole 6. The indicating and recording circuit is then connected between spaced points in the conducting area such as the casing 5 and the electrode 13. Since electrothermal, electrochemical, telluric, or other stray currents may tend to influence the indicating or recording equipment 15, such equipment is first adjusted to balance out all of these disturbing currents. An alternating potential is then applied between the electrodes 4 and 13 from the generator 1 and the electrode 4 whereby a unidirectional current is made to flow thru the earth between the casing 5 and the electrode 13. Such unidirectional current will vary in a manner correlatable with the formations traversed by the electrode 4 during its movement within the casing 5 and in this manner the objects of the invention are obtained.

Broadly the invention comprehends means and method for logging cased bore holes by observing the variations in a unidirectional component of current resulting from rectification by varying portions of the casing and passing through the surrounding formations.

The invention claimed is:

1. In a device for determining the nature of formations traversed by a bore hole the combination of, a well bore having a casing therein, an electrode movable within said casing whereby said electrode traverses the formations penetrated by the well bore, a second electrode embedded in the earth in spaced relation with the well bore, means for passing an alternating electric current through the earth between said electrodes, and means for measuring the variations in rectified current flowing between the casing and said second electrode as indications of the stratigraphy of the area penetrated by the well bore.

2. In a device for determining the stratigraphy of an area penetrated by a bore hole the combination of, a well bore having a casing therein, an electrode movable within said casing, a ground electrode in spaced relation with the well bore, means for passing an alternating electric current through the casing and the earth between said electrodes, a second ground electrode in spaced relation with the well bore, and means for measuring the direct current flowing between the casing and said second ground electrode as the movable electrode traverses the casing.

3. Apparatus for logging a cased well bore comprising, a pair of electrically connected electrodes, one of said electrodes being adapted to be lowered into the well bore on a conductor cable, means for passing an alternating current through the earth between said electrodes, and means for simultaneously measuring the direct current flowing between the well casing and a point in spaced relation therewith as the movable electrode traverses the formations penetrated by the well bore.

4. Apparatus for logging a cased well bore comprising, a pair of electrically connected electrodes, means for lowering one of said electrodes in a well bore, the other of said electrodes being grounded in spaced relation with the well bore, means for passing an alternating electric current through the well casing and the earth between said electrodes and means for simultaneously measuring, between spaced points, the variations in the direct electrical potential created by the flow of rectified electric current flowing between the electrodes.

5. A method of logging a cased well by means of an alternating electric current comprising the steps of passing an alternating electric current from various depths in the well through the casing and surrounding formations to a point in spaced relation with the mouth of the well, and measuring the rectified electric current flowing through the earth between the well casing and said point.

6. A method of logging a cased well bore by means of an alternating electric current comprising the steps of, passing an alternating electric current from various depths within the casing to a point in the earth spaced from the well bore, and simultaneously measuring the variations in the rectified current flowing between the casing and such point.

7. A method of logging a cased well bore by means of an alternating electric current comprising the steps of, passing an alternating electric current from various depths within the casing to a point in the earth spaced from the well bore, and simultaneously measuring between spaced points the variations in the direct electrical potential created by the flow of rectified electric current flowing from the casing to such point.

EDWARD LIPSON.